(12) United States Patent
Hill et al.

(10) Patent No.: US 9,505,632 B2
(45) Date of Patent: Nov. 29, 2016

(54) COMPOSITIONS AND MATERIALS FOR ELECTRONIC APPLICATIONS

(71) Applicant: Skyworks Solutions, Inc., Woburn, MA (US)

(72) Inventors: Michael David Hill, Frederick, MD (US); David Bowie Cruickshank, Rockville, MD (US); Kelvin M. Anderson, Adamstown, MD (US)

(73) Assignee: Skyworks Solutions, Inc., Woburn, MA (US)

( * ) Notice: Subject to any disclaimer, the term of this patent is extended or adjusted under 35 U.S.C. 154(b) by 85 days.

(21) Appl. No.: 14/452,340

(22) Filed: Aug. 5, 2014

(65) Prior Publication Data

US 2014/0346387 A1 Nov. 27, 2014

Related U.S. Application Data

(63) Continuation-in-part of application No. 13/241,033, filed on Sep. 22, 2011, now abandoned.

(60) Provisional application No. 61/385,327, filed on Sep. 22, 2010, provisional application No. 61/418,367, filed on Nov. 30, 2010.

(51) Int. Cl.
| | |
|---|---|
| *H01F 1/22* | (2006.01) |
| *C01G 53/00* | (2006.01) |
| *C01G 49/00* | (2006.01) |
| *C04B 35/26* | (2006.01) |
| *H01F 1/34* | (2006.01) |

(52) U.S. Cl.
CPC ......... *C01G 53/006* (2013.01); *C01G 49/0018* (2013.01); *C04B 35/265* (2013.01); *H01F 1/344* (2013.01); *C01P 2002/32* (2013.01); *C01P 2002/54* (2013.01); *C01P 2006/32* (2013.01); *C01P 2006/40* (2013.01); *C01P 2006/42* (2013.01); *C04B 2235/3262* (2013.01); *C04B 2235/3275* (2013.01); *C04B 2235/3279* (2013.01); *C04B 2235/3281* (2013.01); *C04B 2235/3284* (2013.01); *C04B 2235/6585* (2013.01); *C04B 2235/763* (2013.01); *C04B 2235/81* (2013.01)

(58) Field of Classification Search
CPC .................................................. C04B 35/265
See application file for complete search history.

(56) References Cited

U.S. PATENT DOCUMENTS

| | | | | |
|---|---|---|---|---|
| 3,020,426 A | * | 2/1962 | van Der Burgt ...... | C04B 35/265 252/62.56 |
| 3,036,007 A | * | 5/1962 | Buykx et al. ......... | C04B 35/265 252/62.56 |
| 5,626,789 A | * | 5/1997 | Varshney ............ | C04B 35/2616 252/62.56 |
| 6,071,430 A | | 6/2000 | LeBourgeois et al. | |
| 6,436,307 B1 | | 8/2002 | LeBourgeois et al. | |
| 7,348,374 B2 | * | 3/2008 | Martinazzo ............ | C09D 5/033 427/522 |
| 2007/0231614 A1 | | 10/2007 | Kondo et al. | |
| 2012/0068103 A1 | | 3/2012 | Hill et al. | |

FOREIGN PATENT DOCUMENTS

| | | | |
|---|---|---|---|
| EP | 1 065 676 | | 1/2001 |
| EP | 1 541 640 | | 6/2005 |
| EP | 1541641 | * | 6/2005 |
| JP | 48-061623 | * | 8/1973 |
| JP | 59-121157 | | 7/1984 |
| JP | 10-041120 | | 2/1998 |
| WO | WO 98/31072 | * | 7/1998 |

OTHER PUBLICATIONS

Derwent abstract for CN 1962454, May 16, 2007.*
Abstract for CN 101792319, Aug. 4, 2010.*
Mallapur, M.M., et al., "Structural and electrical properties of nanocrystalline cobalt substituted nickel zinc ferrite." *Journal of Alloys and Compounds*. 2009. pp. 797-802.
Search Report and Written Opinion dated May 1, 2012, for corresponding PCT Application No. PCT/US2011/052830.
International Preliminary Report on Patentability dated Mar. 26, 2013, for corresponding PCT Application No. PCT/US2011/052830, in 5 pages.
Extended European Search Report and Written Opinion dated Jan. 7, 2016, for corresponding European Application No. 15179414.6, in 8 pages.
Extended European Search Report and Written Opinion dated Feb. 24, 2016, for corresponding European Application No. 11827568.4, in 9 pages.

* cited by examiner

*Primary Examiner* — Carol M Koslow
(74) *Attorney, Agent, or Firm* — Knobbe Martens Olson and Bear LLP

(57) ABSTRACT

Embodiments disclosed herein relate to using cobalt (Co) to fine tune the magnetic properties, such as permeability and magnetic loss, of nickel-zinc ferrites to improve the material performance in electronic applications. The method comprises replacing nickel (Ni) with sufficient $Co^{+2}$ such that the relaxation peak associated with the $Co^{+2}$ substitution and the relaxation peak associated with the nickel to zinc (Ni/Zn) ratio are into near coincidence. When the relaxation peaks overlap, the material permeability can be substantially maximized and magnetic loss substantially minimized. The resulting materials are useful and provide superior performance particularly for devices operating at the 13.56 MHz ISM band.

8 Claims, 18 Drawing Sheets

| | | |
|---|---|---|
| FIG. 2A | FIG. 2B | FIG. 2C | FIG. 2D |
| FIG. 2E | FIG. 2F | FIG. 2G | FIG. 2H |
| FIG. 2I | FIG. 2J | FIG. 2K | FIG. 2L |

NICKEL ZINC COBALT SYSTEM (0 TO 0.03 $Co^{+2}$ IN 0.0025 STEPS)

FIG. 2

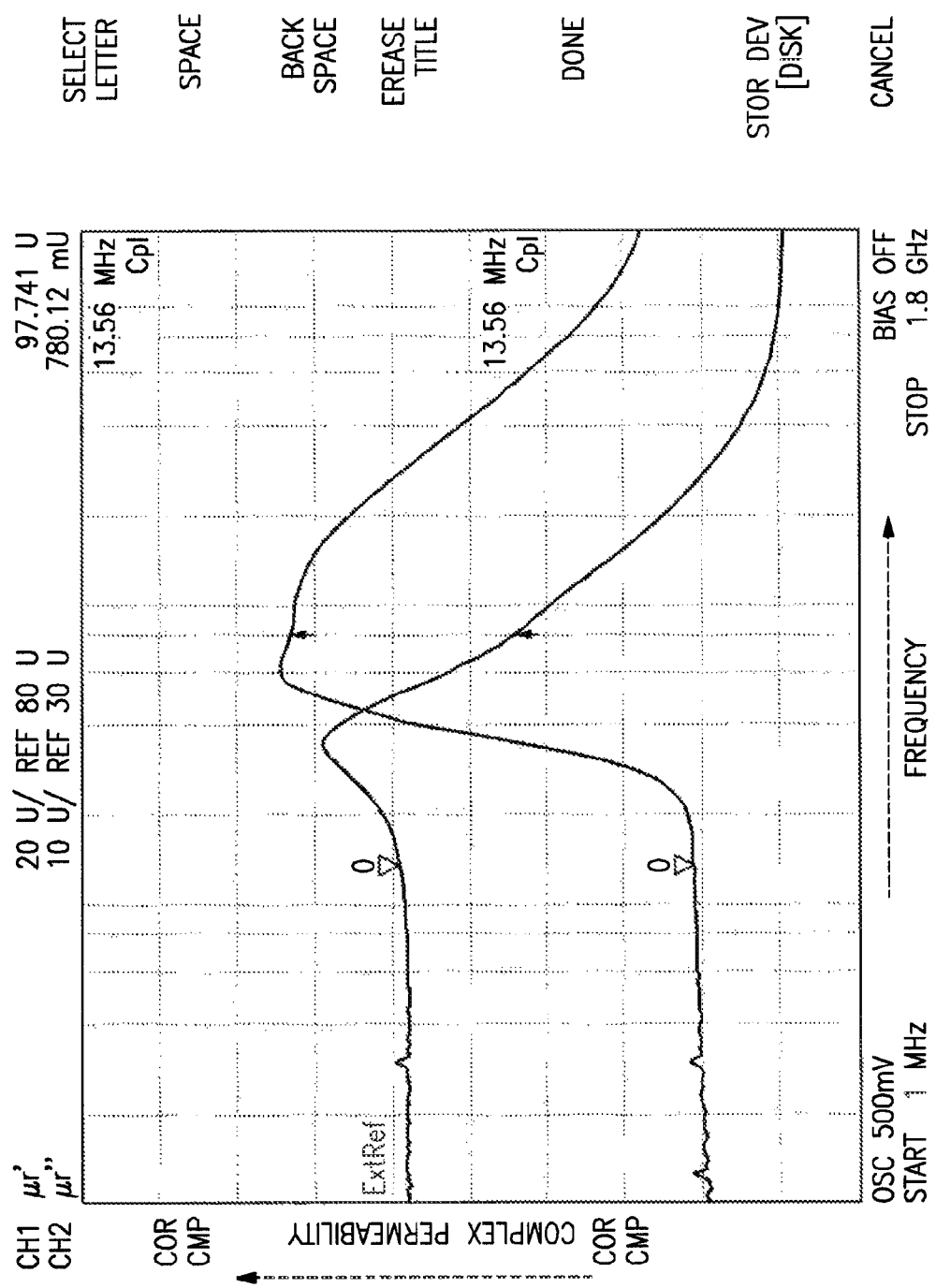

COMPOSITIONS AND MATERIALS FOR ELECTRONIC APPLICATIONS

CROSS-REFERENCE TO RELATED APPLICATIONS

This application is a continuation-in-part of assignee's U.S. application Ser. No. 13/241,033, filed Sep. 22, 2011, now abandoned, which claims the benefit of priority under 35 U.S.C. §119(e) of U.S. Provisional Application No. 61/385,327 filed on Sep. 22, 2010 and U.S. Provisional Application No. 61/418,367 filed on Nov. 30, 2010. Each of the application is incorporated herein by reference in its entirety.

INCORPORATION BY REFERENCE TO ANY PRIORITY APPLICATIONS

Any and all applications for which a foreign or domestic priority claim is identified in the Application Data Sheet of the present application are hereby incorporated by reference under 37 CFR 1.57.

BACKGROUND OF THE INVENTION

1. Field of the Invention

Embodiments of the invention relate to compositions and materials useful in electronic applications, and in particular, in radio frequency (RF) electronics.

2. Description of the Related Art

Various crystalline materials with magnetic properties have been used as components in electronic devices such as cellular phones, biomedical devices, and RFID sensors. It is often desirable to modify the composition of these materials to improve their performance characteristics. For example, doping or ion substitution in a lattice site can be used to tune certain magnetic properties of the material to improve device performance at radio frequency ranges. However, different ions introduce different changes in material property that often result in performance trade-offs. Thus, there is a continuing need to fine tune the composition of crystalline materials to optimize their magnetic properties, particularly for RF applications.

SUMMARY

The compositions, materials, methods of preparation, devices, and systems of this disclosure each have several aspects, no single one of which is solely responsible for its desirable attributes. Without limiting the scope of this invention, its more prominent features will now be discussed briefly.

Any terms not directly defined herein shall be understood to have all of the meanings commonly associated with them as understood within the art. Certain terms are discussed below, or elsewhere in the specification, to provide additional guidance to the practitioner in describing the compositions, methods, systems, and the like of various embodiments, and how to make or use them. It will be appreciated that the same thing may be said in more than one way. Consequently, alternative language and synonyms may be used for any one or more of the terms discussed herein. No significance is to be placed upon whether or not a term is elaborated or discussed herein. Some synonyms or substitutable methods, materials and the like are provided. Recital of one or a few synonyms or equivalents does not exclude use of other synonyms or equivalents, unless it is explicitly stated. Use of examples in the specification, including examples of terms, is for illustrative purposes only and does not limit the scope and meaning of the embodiments herein.

Embodiments disclosed herein relate to using cobalt (Co) to fine tune the magnetic properties, such as permeability and magnetic loss, of nickel-zinc ferrites to improve the material performance in electronic applications. In one embodiment, the method comprises replacing nickel (Ni) with sufficient $Co^{+2}$ such that the relaxation peak associated with the $Co^{+2}$ substitution and the relaxation peak associated with the nickel to zinc (Ni/Zn) ratio are into near coincidence. Advantageously, when the relaxation peaks overlap, the material permeability can be substantially maximized and magnetic loss substantially minimized. The resulting materials are useful and provide superior performance particularly for devices operating at the 13.56 MHz ISM band. In one embodiment, permeability in excess of 100 is achieved with a Q factor of the same order at 13.56 In another embodiment, the method comprises doping NiZn spinels with $Co^{+2}$ to produce a series of NiZn plus Co materials with reducing Zn, which covers up to about 200 MHz with permeability in excess of 10 and favorable Q factor. The method of using Co to fine tune NiZn compositions are preferably achieved through advanced process control using high resolution X-ray fluorescence.

In a preferred embodiment, the material composition is represented by the formula $Ni_{1-x-y}Zn_xCo_yFe_2O_4$ which can be formed by doping $Ni_{(1-x)}Zn_xFe_2O_4$ with $Co^{+2}$. In certain implementations, x=0.2 to 0.6, and 0≤y<0.2. Embodiments of the material composition can have the spinel crystal structure and can be single phase. The material compositions can be used in a wide variety of applications including but not limited to antennas with high material content such as those useful for cellular phones, biomedical devices, and RFID sensors.

In some embodiments, an antenna designed to operate at the 13.56 MHz ISM band comprising nickel zinc ferrite doped with $Co^{+2}$ is provided. Preferably, the relaxation peak associated with the $Co^{+2}$ substitution and the relaxation peak associated with the Ni/Zn ratio are in near coincidence. In one implementation, the nickel zinc ferrite doped with $Co^{+2}$ can be represented by the formula $Ni_{1-x-y}Zn_xCo_yFe_2O_4$, where x=0.2 to 0.6, and 0≤y<0.2. In some other embodiments, an RFID sensor designed to operate at the 13.56 MHz ISM band comprising nickel zinc ferrite doped with $Co^{+2}$ is provided. Preferably, the relaxation peak associated with the $Co^{+2}$ substitution and the relaxation peak associated with the Ni/Zn ratio are in near coincidence. In one implementation, the nickel zinc ferrite doped with $Co^{-2}$ can be represented by the formula $Ni_{1-x-y}Zn_xCo_yFe_2O_4$, where x >0.2 to 0.6, and 0≤y<0.2.

Some embodiments include methods of replacing at least some of the nickel (Ni) with sufficient Cobalt ($Co^{2+}$) in nickel-zinc ferrites. In one embodiment, the method comprises blending NiO, $Fe_2O_3$, $CoO_x$, $MnO_x$, ZnO, and $CuO_x$ to form a mixture having a pre-determined ratio of Ni to Zn and a pre-determined Co concentration. The formula for this series of materials is preferably $Ni_{t-w-x-y-z}Zn_wCo_xMn_yCu_zFe_2O_4$. The method further comprises drying the material, followed by calcining, milling, and spray drying the material. The method further comprises forming the part and then sintering the part. The part can be an antenna such as those useful for cellular phones, biomedical devices, and RFID sensors.

BRIEF DESCRIPTION OF THE DRAWINGS

FIGS. 2A-2L illustrates a series of cobalt spectra showing the shift in frequency (x axis) of the first peak (lowest frequency) as well as complex permeability (y axis);

FIG. 3 illustrates that two relaxation peaks are observed in the magnetic permeability spectra of the material between 100 kHz and 1 GHz;

DETAILED DESCRIPTION OF THE PREFERRED EMBODIMENT

Disclosed herein are methods for fine tuning the magnetic properties of nickel zinc ferrites to improve the material performance in various electronic applications. Also disclosed herein are modified nickel zinc ferrite materials that are particularly suitable for use in various electronic devices operating at the 13.56 MHz ISM band. The modified nickel zinc ferrite material prepared according to embodiments described in the disclosure exhibits favorable magnetic properties such as increasing permeability and reducing magnetic loss.

Aspects and embodiments of the present invention are directed to improved materials for use in electronic devices. For example, these materials may be used to form an RF antenna for implantable medical devices, such as glucose sensors. These materials may also be used for other purposes, such as to form antennas for non-implantable devices, or other components of implantable or non-implantable devices. Advantageously, the materials have a combination of superior magnetic permeability and magnetic loss tangent at or about the 13.56 MHz industrial, medical and scientific band. In various embodiments, the materials are formed by fine tuning the permeability and magnetic loss of NiZn spinels with cobalt. As described in greater detail below, by bringing the relaxation peak associated with the $Co^{2+}$ substitution and that associated with the Ni/Zn ratio into near coincidence, the permeability can be maximized and the magnetic loss minimized, such that permeability in excess of 100 can be achieved with Qs of the same order at 13.56 MHz. The same technique can be used to produce a series of NiZn plus Co materials with reducing Zn covering up to 200 MHz with permeability in excess of 10 and good Q.

Ni—Zn Systems

Figure 1:
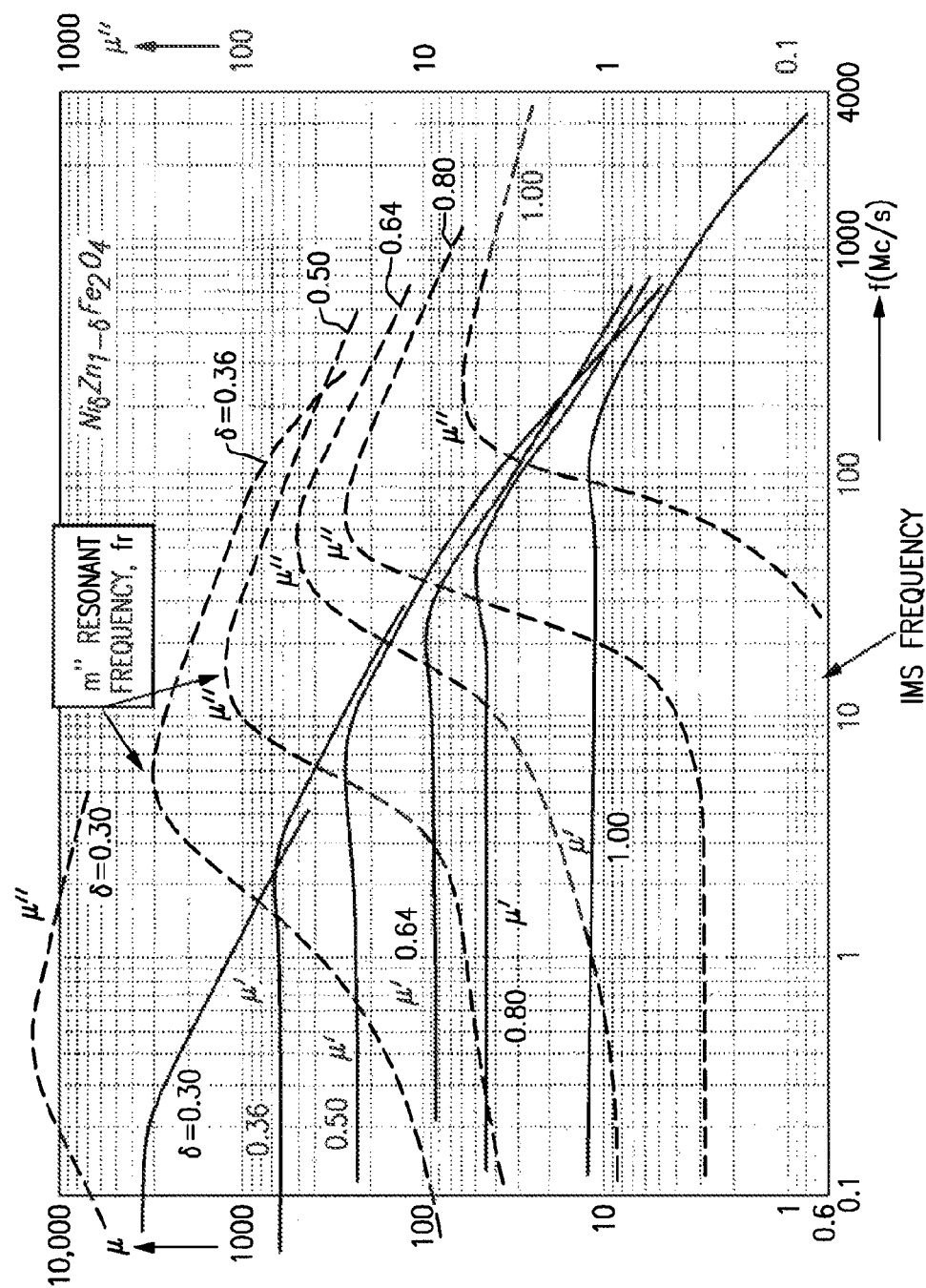
FIG. 1 illustrates the variations in permeability (μ) of a nickel-zinc system at various levels of Ni and Zn content.
Figure 2A:
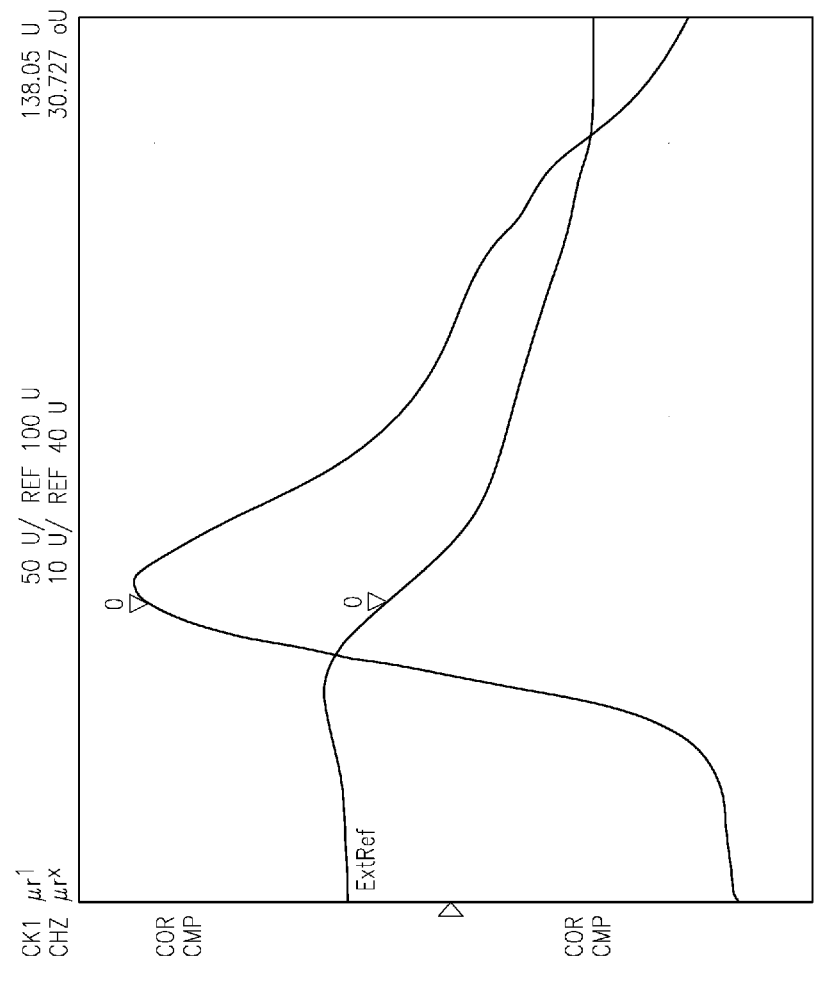
Figure 2B:
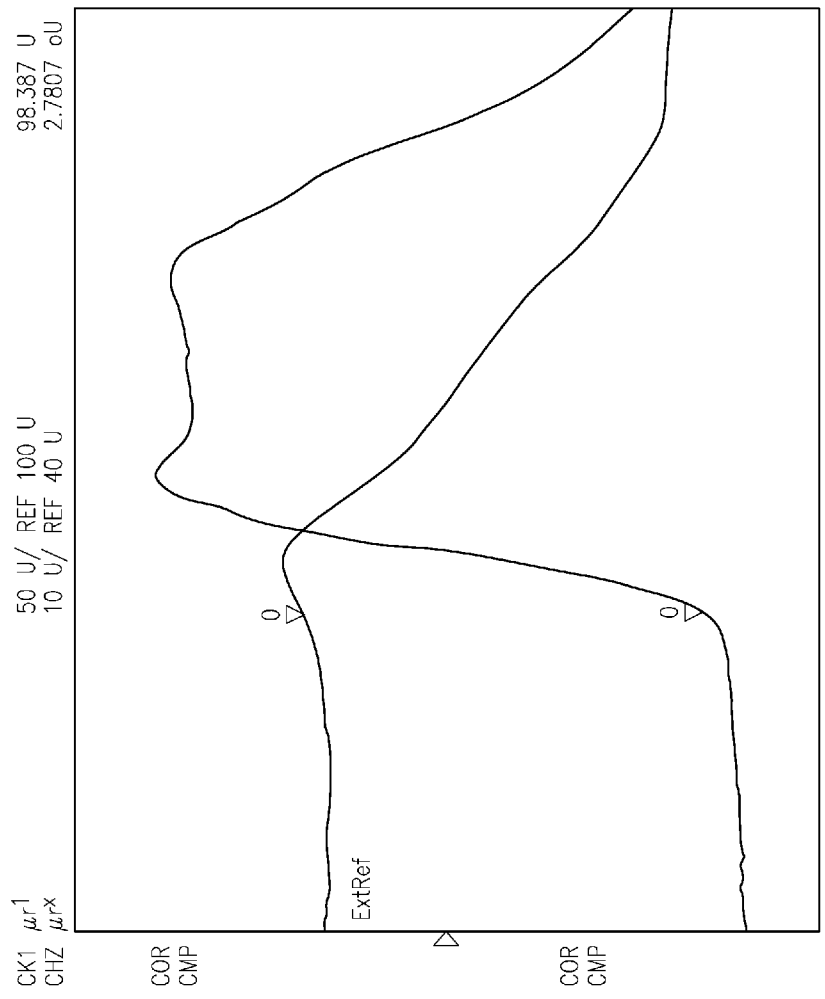
Figure 2C:
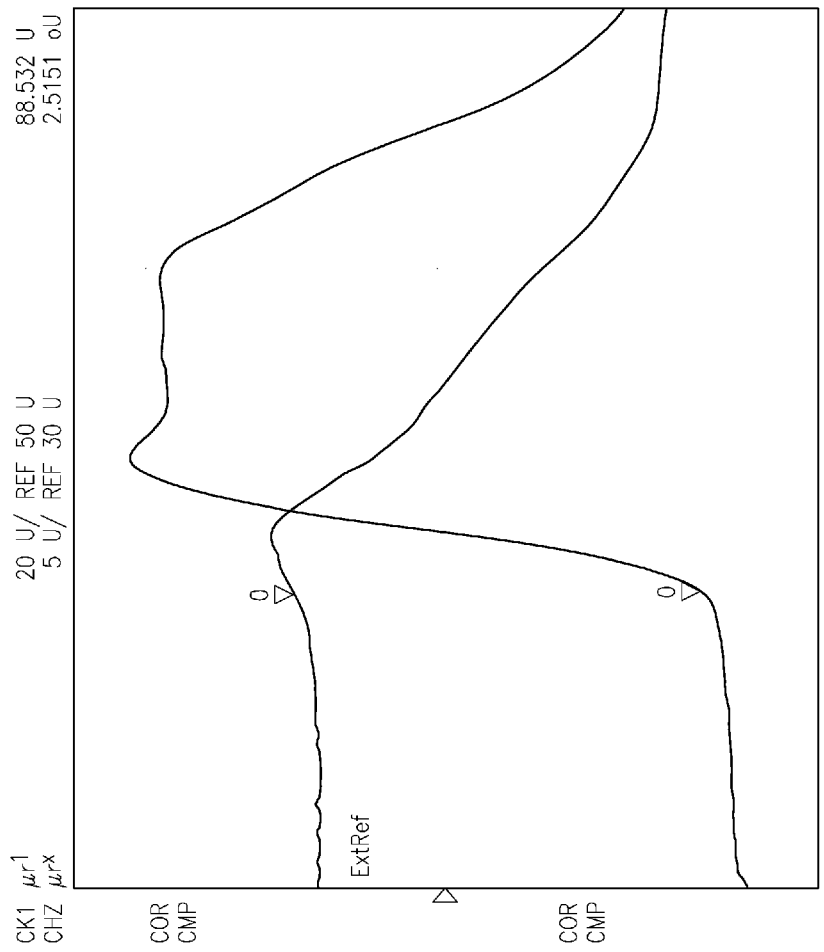
Figure 2D:
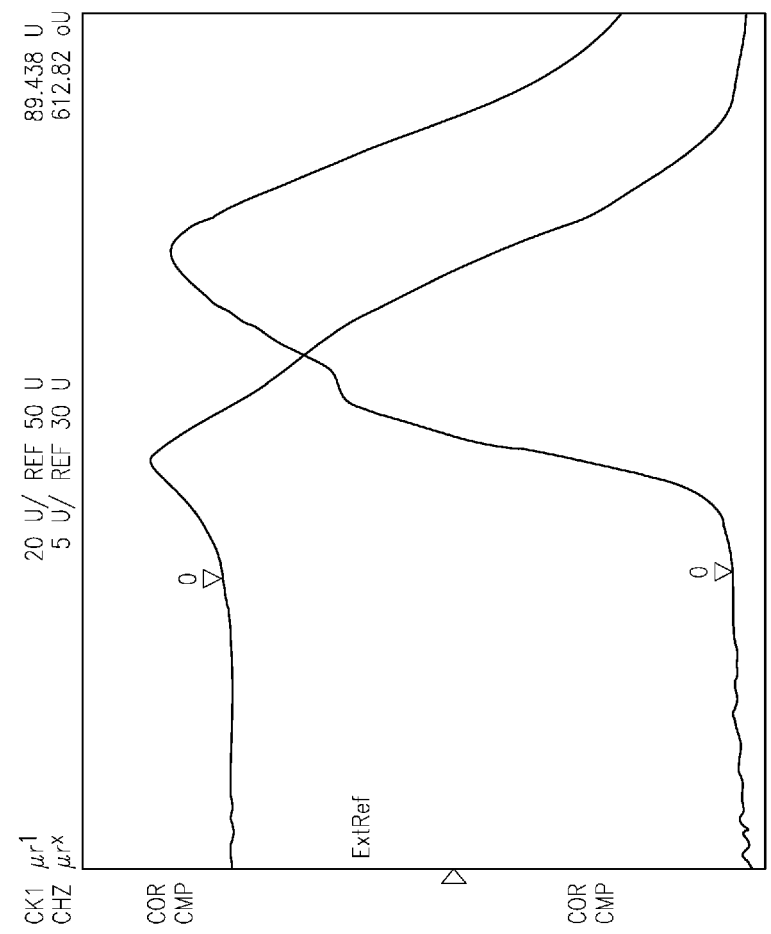
Figure 2E:
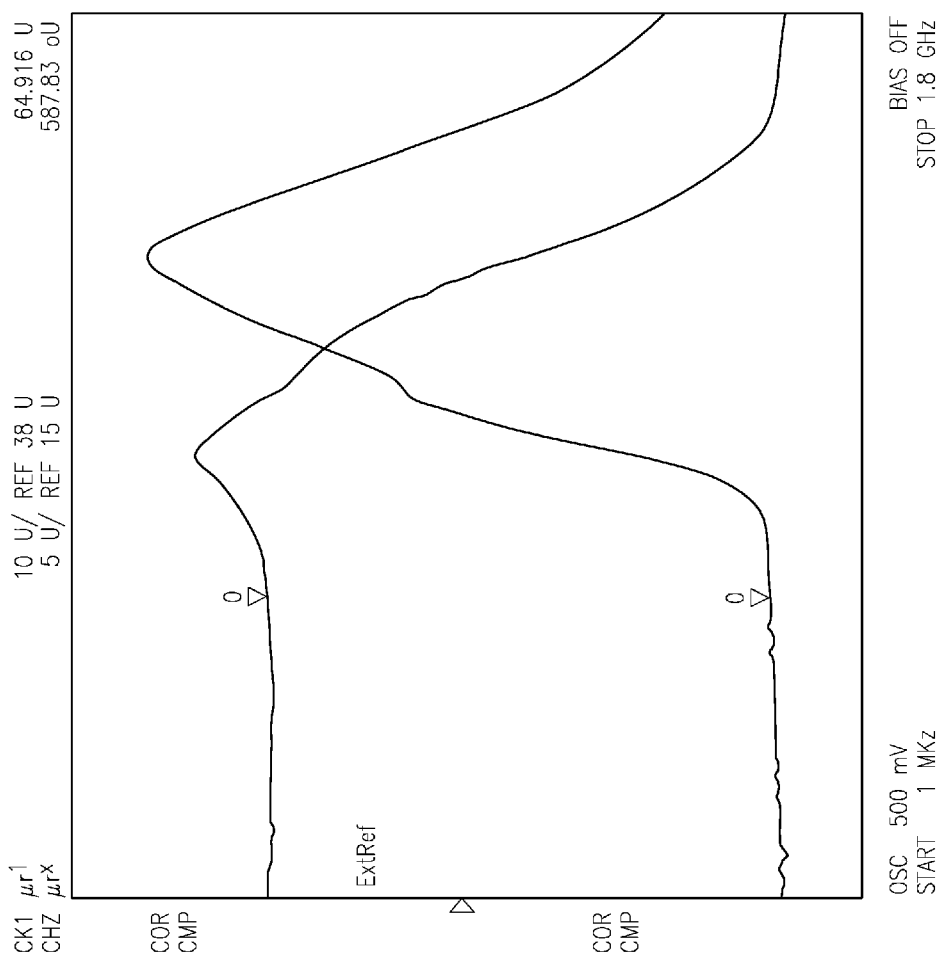
Figure 2F:
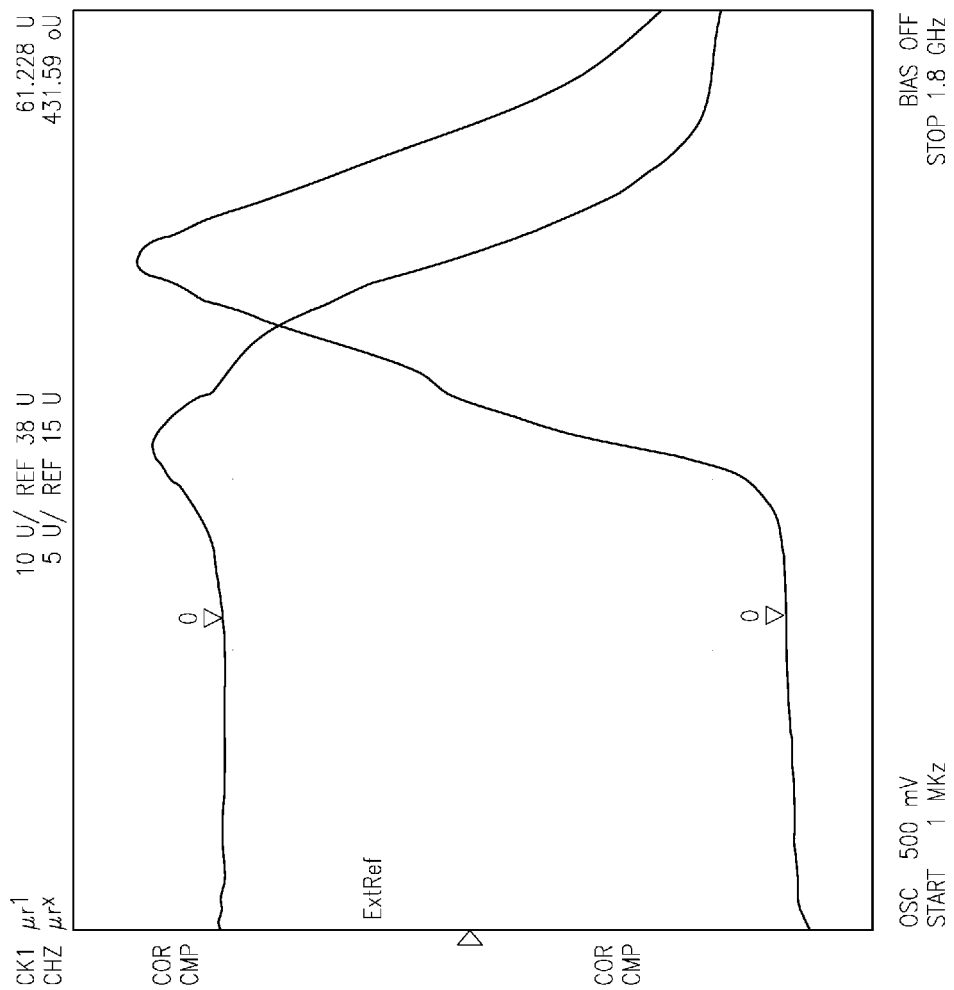
Figure 2G:
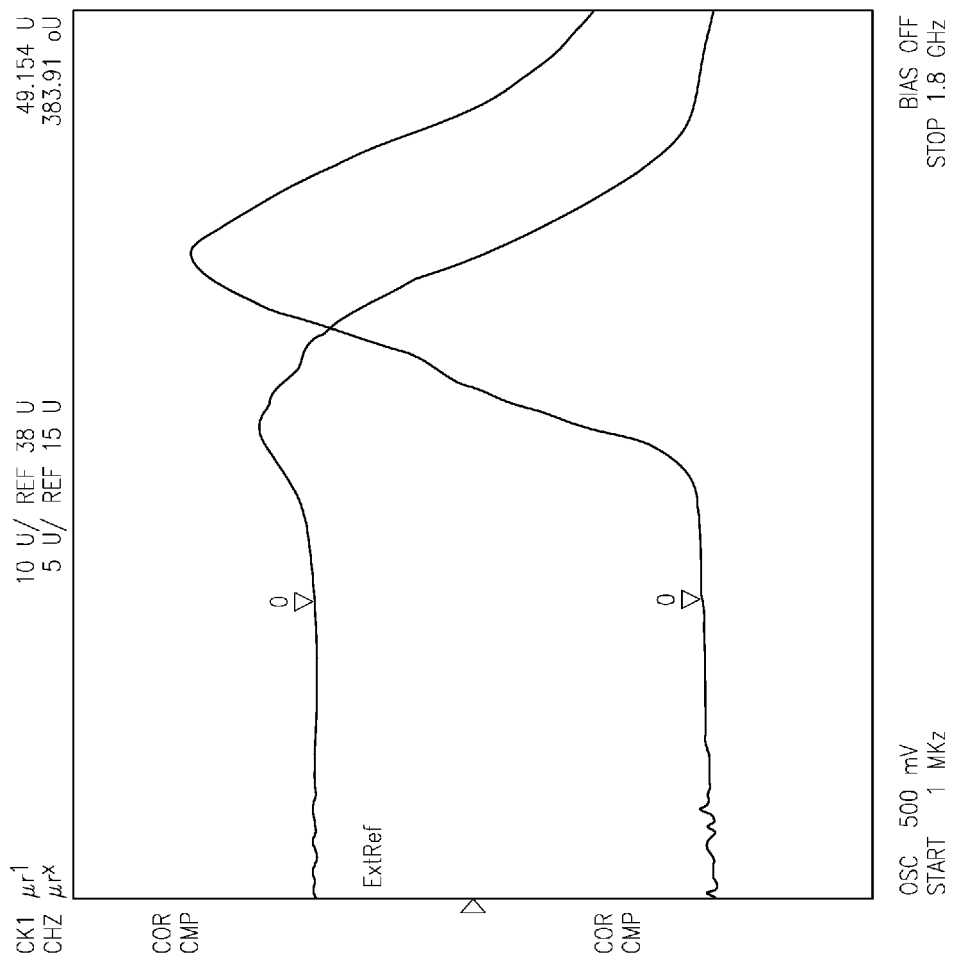
Figure 2H:
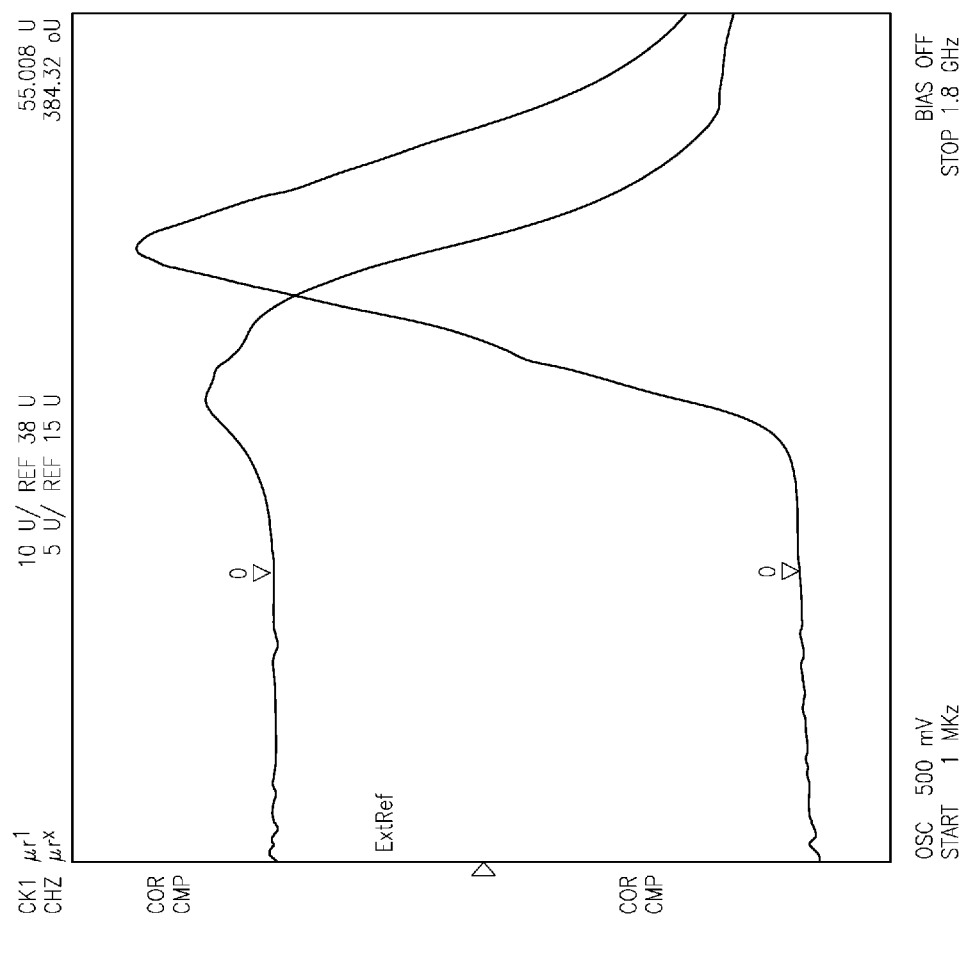
Figure 21:
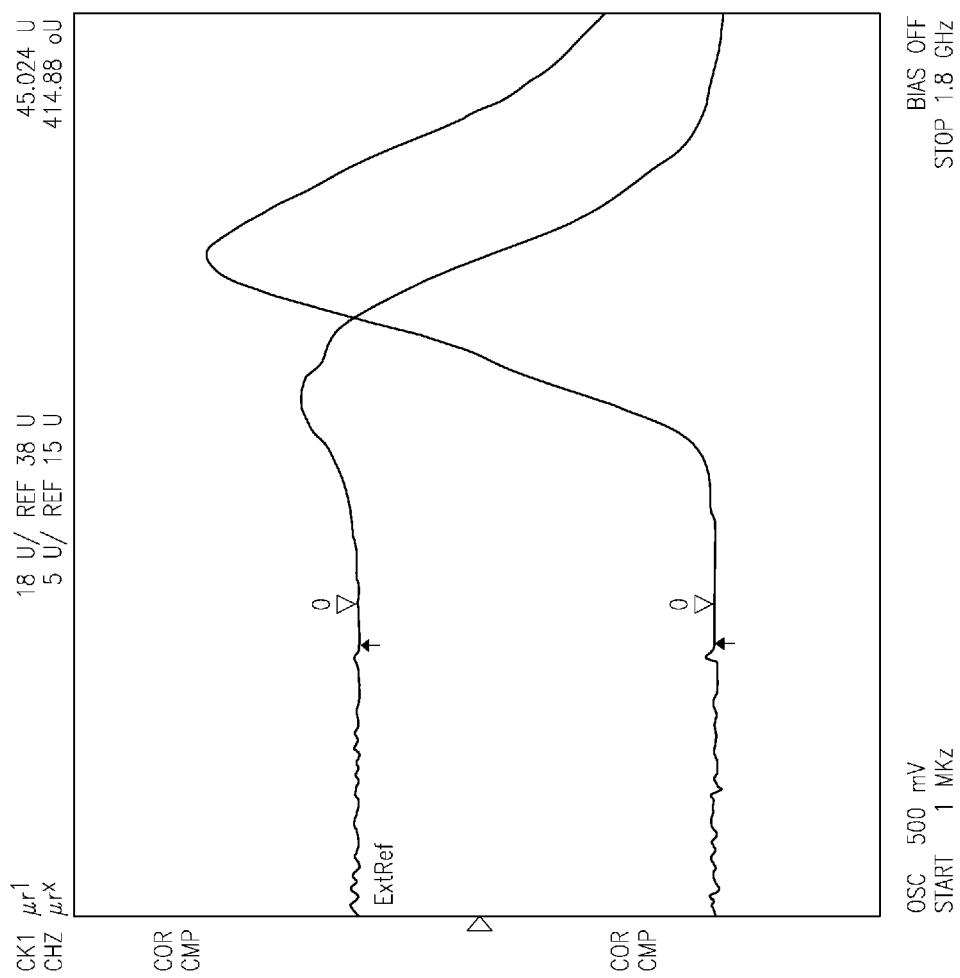
Figure 2J:
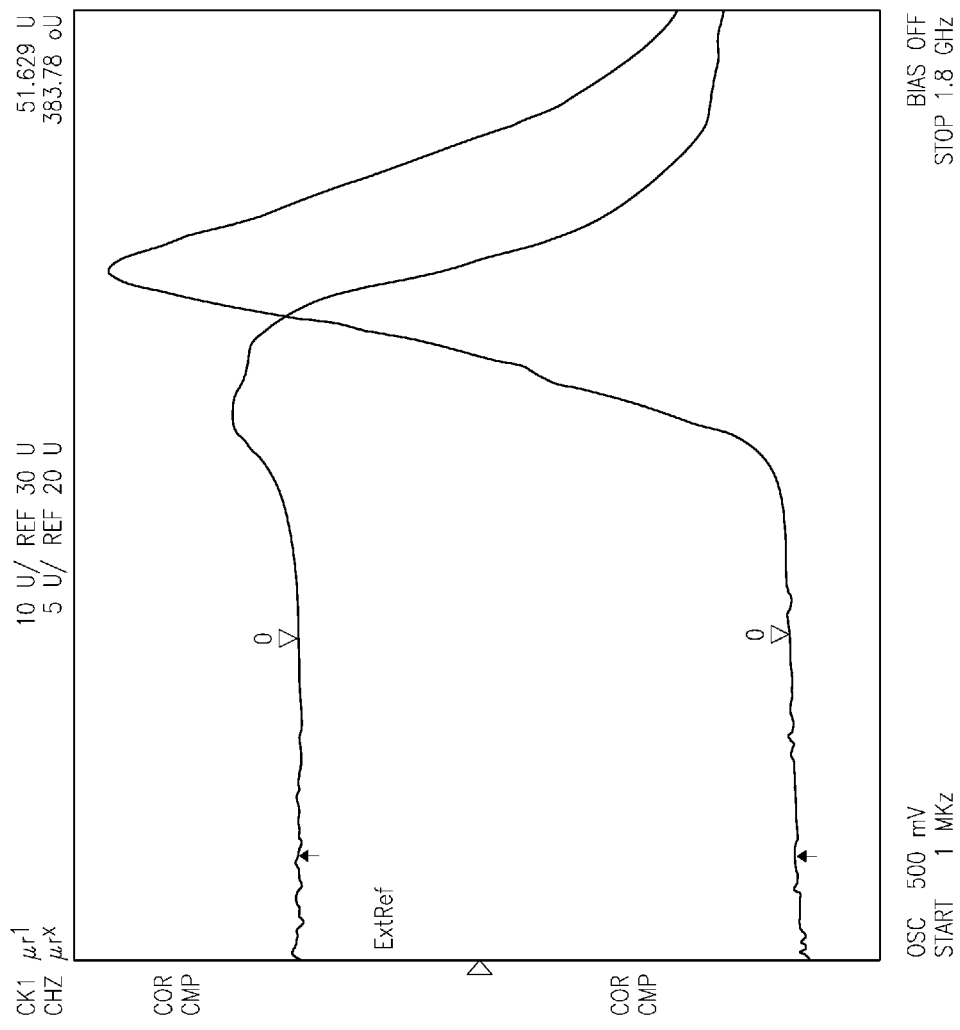
Figure 2K:
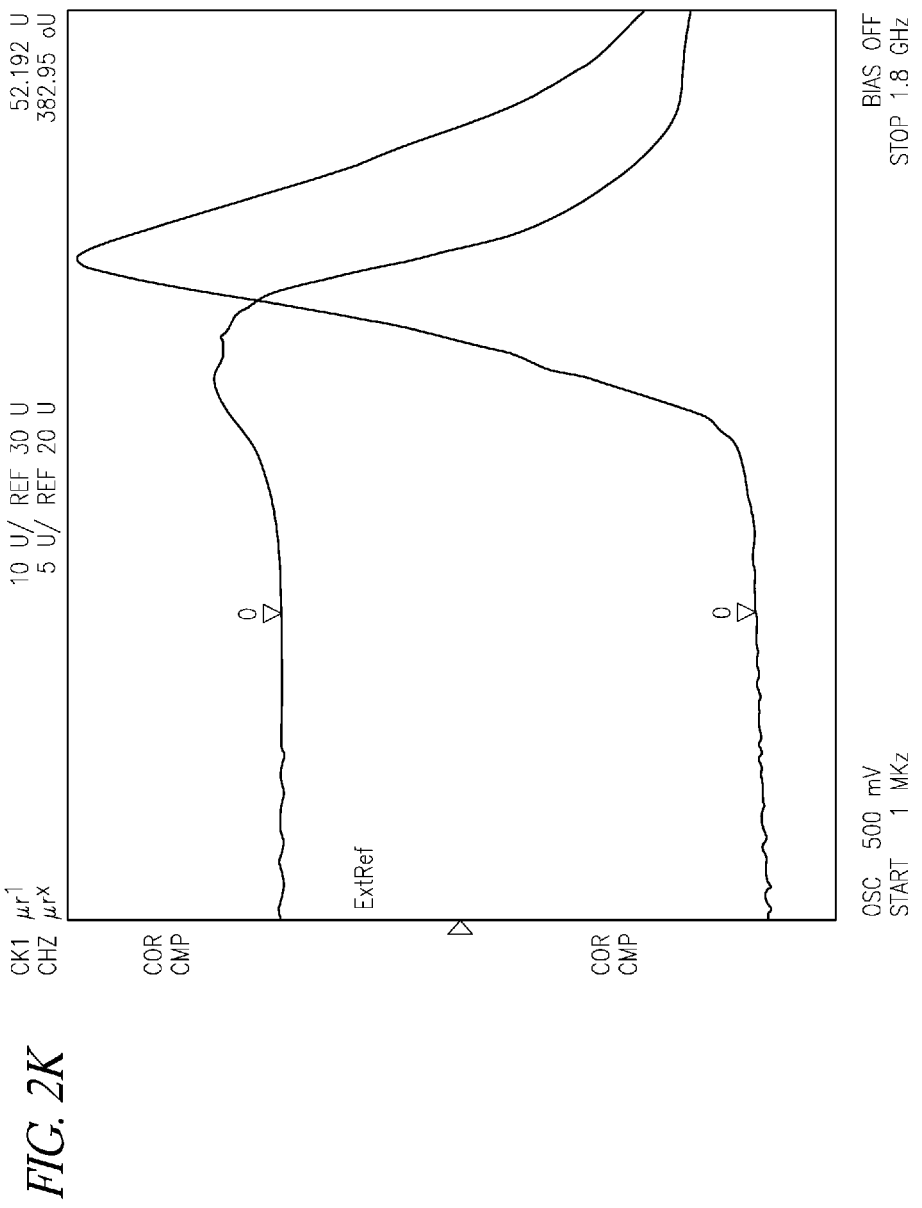
Figure 2L:
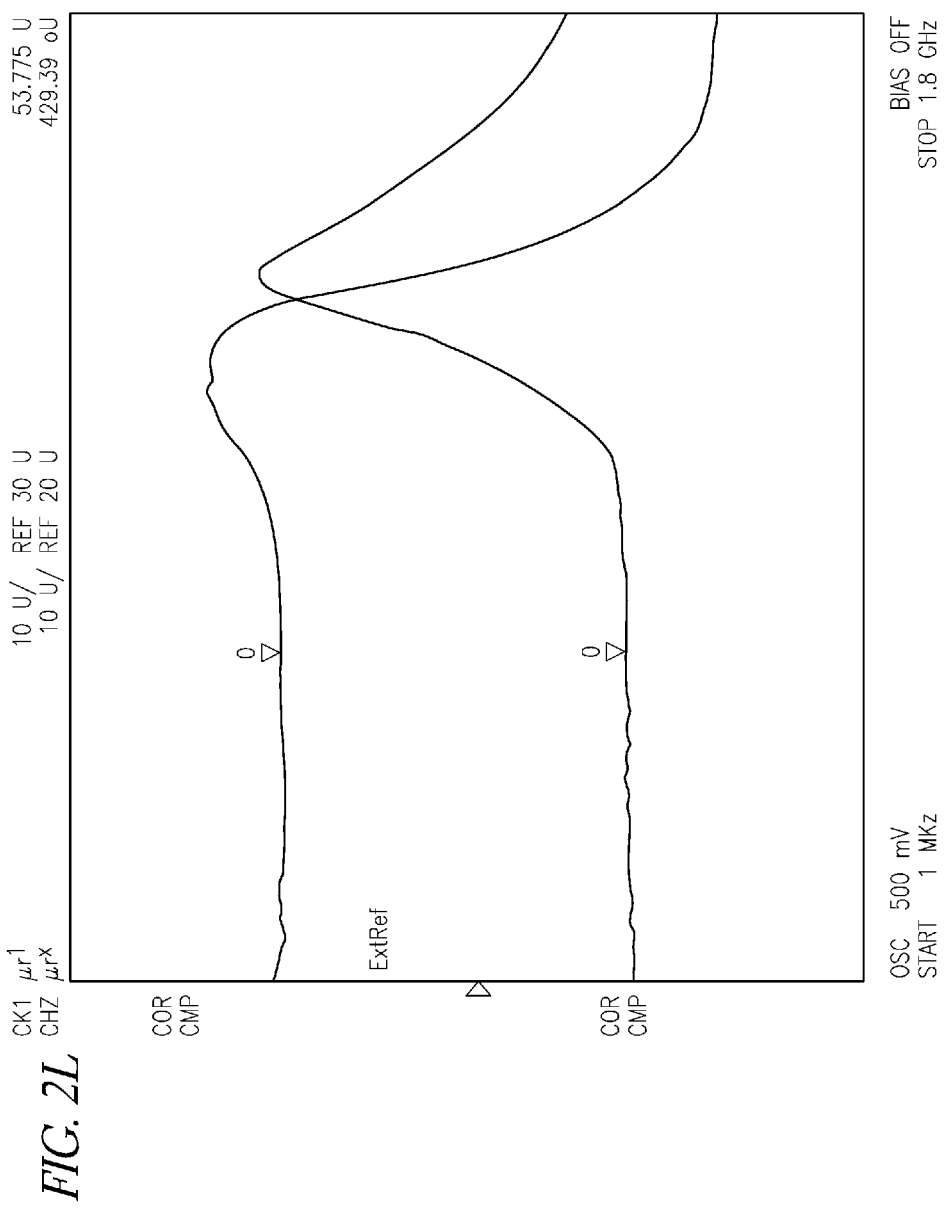

Nickel-zinc ferrites can be represented by the general formula $Ni_xZn_{1-x}Fe_2O_4$ and are useful in electromagnetic applications that require high permeability. FIG. 1 illustrates the variations in permeability (μ) of a nickel-zinc ferrite system at various levels of Ni and Zn content. For example, the permeability decreases with decreasing zinc content at about 13.56 MHz. Variation of permeability suggests that low magnetic loss (high magnetic Q) material can be derived from the Ni-Zn system with low or zero zinc content in applications where the permeability is not so important. However, for certain RFID tags and sensors, the Ni-Zn system does not provide the optimum performance because either the permeability is too low for compositions with favorable Q, or that the Q is too low for compositions with high permeability.

The Effect of Cobalt Doping

FIG. 2 illustrates a series of cobalt spectra showing the shift in frequency (x axis) of the first peak (lowest frequency) as well as complex permeability (y axis). The effect of cobalt on frequency begins to stall out at about 0.025 cobalt because the magnetocrystalline anisotropy eventually passes through a minimum, just as the complex permeability flattens out, then falls again. As shown in FIG. 2, the cobalt driven first peak eventually merges with the second peak as the $Co^{+2}$ concentration increases.

FIG. 3 shows that two relaxation peaks are observed in the magnetic permeability spectra of the material between 100 kHz and 1 GHz. Without being bound to a particular theory, it is believed that the lower frequency peak corresponds to magnetic domain wall rotation and the higher frequency peak corresponds to magnetic domain wall bulging. It is also believed that the cobalt oxide may push the lower frequency relaxation peak associated with the magnetic loss to higher frequency values by reducing the magnetocrystalline anisotropy of the spinel material. These higher frequency values are, in some embodiments, higher than 13.56 MHz, which is a frequency often used in RFID tags and RF medical sensor applications. It is also believed that manganese may serve to prevent the iron from reducing from $Fe^{3+}$ to $Fe^{2+}$ state and therefore improves the dielectric loss of the material across the spectrum, and copper may serve as a sintering aid allowing the firing temperatures to be reduced, thus preventing Zn volatilization from the surface of a part formed from the material. Both the relaxation peaks referred to above may be adjusted to provide high permeability low-loss materials throughout a range of between about 1 MHz and about 200 MHz.

Without wishing to be bound by theory, it is believed that the second peak is determined by the Ni/Zn ratio and is therefore static for a fixed ratio. The $Co^{2+}$ is lost as a distinguishing peak in the spectrum at higher $Co^{2+}$ concentration. It is also believed that the first peak may be dominated by domain movement, and the second peak may be dominated by rotation and that the peaks can be merged at some $Co^{2+}$ doping levels for a given Ni/Zn ratio, and that only the domain movement peak is strongly susceptible to $Co^{2+}$.

Based on the inventors' theory that domain rotation is driven by the Ni/Zn ratio and is responsible for a characteristic peak frequency, and that wall movement (bulging via magnetorestriction) is driven by the $Co^{2+}$ concentration which creates a second, independent characteristic peak, a combination of $Co^{2+}$ and Ni/Zn can be selected to merge at a given frequency such that the slope of the absorption curve is a given frequency distance way to minimize magnetic losses. The optimum peak position can be selected depending on the desired permeability and loss. For some applications, the optimum peak position is about 100 MHz to give low losses but high permeability at 13.56 MHz.

Modified Ni-Zn Systems

Certain embodiments of the present disclosure provide a modified nickel-zinc ferrite material. The base nickel-zinc ferrite material preferably has a composition that is represented by the formula $Ni_{0.5}Zn_{0.5}Fe_2O_4$. The material has an iron deficiency of between 0.02 and 0.10 formula units, a cobalt content of between 0 and 0.05 formula units (substituting for Ni), and manganese (substituting for Fe) and copper (substituting for Ni) contents of between 0 and 0.03 formula units. Embodiments of the material can have a spinel crystal structure and can be single phase.

In some implementations, the modified Ni-Zn ferrite material can have a composition represented by the formula $Ni_{1-w-x-y-z}Zn_wCo_xMn_yCu_zFe_2O_4$ where w ranges from 0.2 to 0.6, and x, y, and z each range from 0 to 0.2, and a ranges from 0 to 0.2. In a preferred implementation, w=0.4725, x=0.0225, y=0.02, z=0, and a=0.08, which can result in a material that displays particularly desirable magnetic properties at 13.56 MHz. In another preferred implementation, w=0.4, x=0.0275, y=0.01, z=0, and a=0.08, which can result in a material that displays particularly desirable magnetic properties at 27 MHz.

Table 1 below illustrates the effects of embodiments of Co substitution in a fully dense 5000 Gauss $Ni_{1-x-y}Zn_xCo_yFe_2O_4$ Spinel on Spectra.

| Cobalt Substitution (y) | 1st Frequency (MHz) | 2nd Frequency (MHz) | 3rd Frequency (MHz) | Initial Permeability at 1 MHz |
|---|---|---|---|---|
| 0.00 | 16 | merged | merged | 170 |
| 0.005 | 40 | merged | merged | 92 |
| 0.01 | 50 | 70 | 150 | 68 |
| 0.0125 | 60 | 80 | 200 | 62 |
| 0.015 | 60 | 80 | 250 | 50 |
| 0.0175 | 60 | 85 | 250 | 55 |
| 0.02 | 70 | 100 | 250 | 45 |
| 0.0225 | 70 | 110 | 230 | 51 |
| 0.025 | 80 | 110 | 230 | 52 |
| 0.275 | 100 | 120 | 230 | 54 |
| 0.03 | 100 | 130 | 230 | 50 |

Methods of Manufacturing Modified Ni-Zn Material

Figure 4:
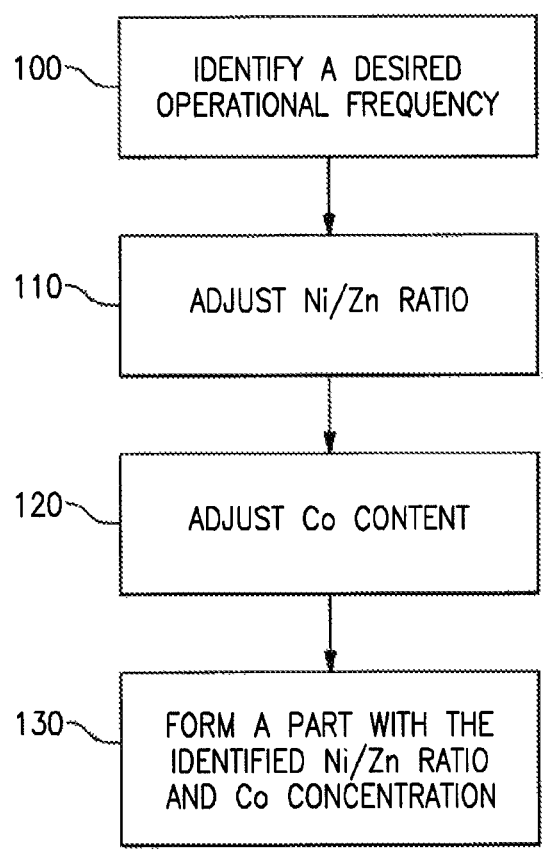
FIG. 4 illustrates a method of tuning the magnetic properties of a Ni—Zn ferrite system according to one embodiment of the present disclosure.

FIG. 4 illustrates a method of tuning the magnetic properties of a Ni-Zn ferrite system according to one embodiment of the present disclosure. The method begins with identifying a desired operational frequency in Step 100, followed by adjusting the nickel to zinc ratio in Step 110. Preferably, the Ni/Zn ratio is adjusted to provide a relaxation absorption peak at a desired frequency above a desired low magnetic loss frequency. The method further comprises adjusting the cobalt content in Step 120. Preferably, the cobalt content is adjusted to a level where the cobalt dominated relaxation peak merges into the low frequency end of the Ni/Zn ratio peak. The method can be followed by forming a part with the identified Ni/Zn ratio and Co concentration in Step 130. In some applications, it would be desirable to use excess cobalt because excess cobalt would likely reduce the magnetic permeability without increasing the magnetic loss. A desirable amount of cobalt can be determined by identifying an amount of cobalt that produces a relaxation absorption peak at a frequency that cannot be resolved from the Ni/Zn ratio peak by eye in an impedance analysis trace on the low frequency side. For example, if one were interested in an RF application at 27 MHz, a material could be synthesized with the composition $Ni_{0.5725}Co_{0.0275}Zn_{0.4}Fe_2O_4$, which has a permeability of 54 and a magnetic Q greater than 100, wherein the magnetic Q is the ratio of the real permeability to the imaginary permeability at a specified frequency.

Figure 5:
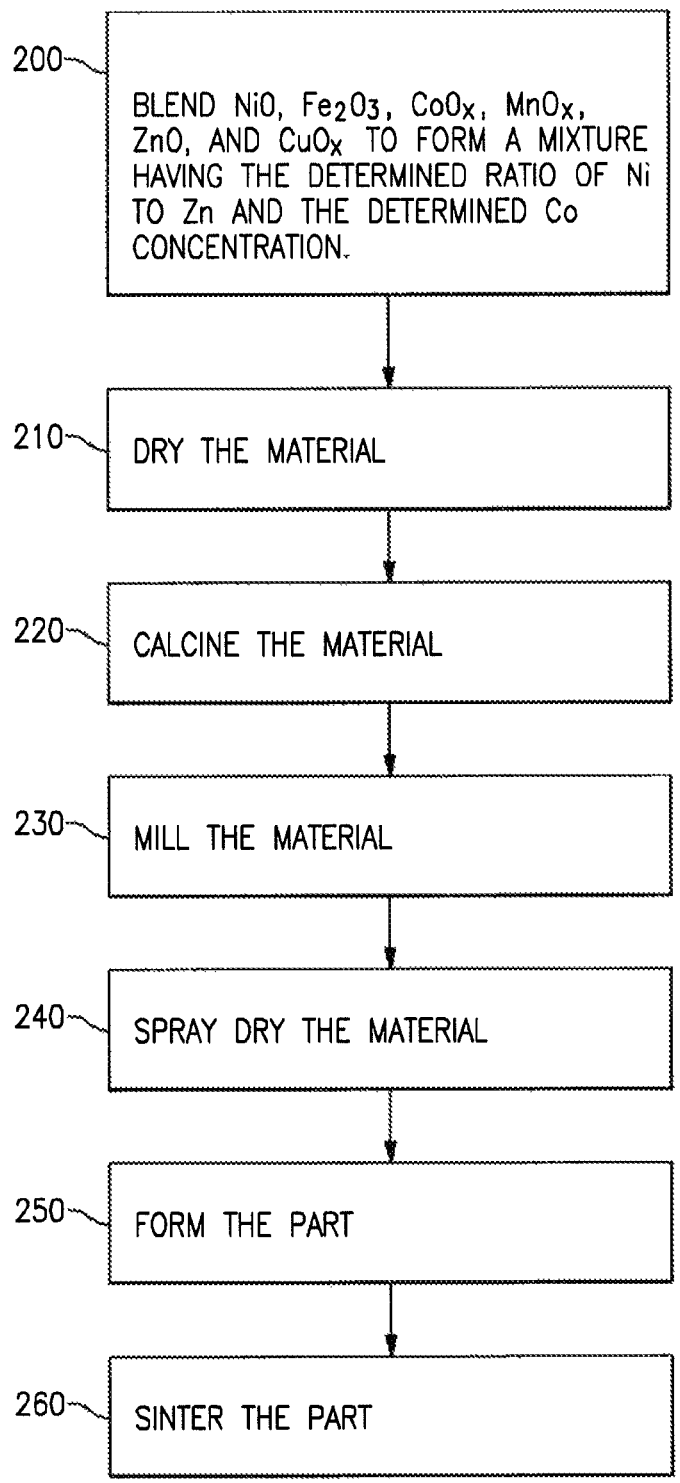
FIG. 5 illustrates a method of manufacturing a cobalt doped nickel-zinc ferrite composition according to one embodiment of the present disclosure.

FIG. 5 illustrates a method of manufacturing a cobalt doped nickel-zinc ferrite composition according to one embodiment of the present disclosure. The method begins with Step 200 in which the raw oxides nickel oxide (NiO), iron oxide ($Fe_2O_3$), zinc oxide (ZnO), copper oxide (CuO, $CuO_2$, $Cu_2O$, and/or $Cu_2O_3$), cobalt oxide (CoO, $Co_2O_3$, and/or $Co_3O_4$), and manganese oxide (MnO, $Mn_2O_3$, $Mn_2O_7$, $Mn_3O_4$, $MnO_2$, and/or $MnO_3$), are blended by a shear mixing method such as a Cowles mixer or by vibratory mill blending. Step 210 indicates drying the material. The method further includes Step 220 in which the material is calcined at a temperature in the range of 900° C.-1,200° C. to react the components of the material and form the spinel phase, followed by Step 230 in which the material is milled to a particle size between 1 to 10 microns, and spray dried with added binder in Step 240. In some implementations, the method further comprises Step 250 in which the material is formed into a part by isostatic or hard die pressing and Step 260 in which the part is sintered to a temperature in the range of 1,100° C.-1400° C. in air or in oxygen.

Figure 6:
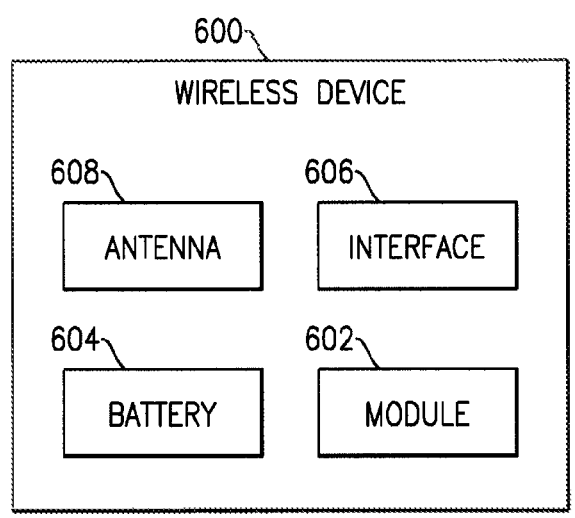
FIG. 6 shows that in some embodiments, a wireless device can incorporate a material composition as described herein.

The material compositions made in accordance with embodiments described herein can be used in a wide variety of applications including but not limited to antennas with high material content such as those useful for cellular phones, biomedical devices, and RFID sensors. FIG. 6 shows that in some embodiments, a wireless device 600 can incorporate a material composition as described herein. Such a device 600 can include a module 602, a battery 604, an interface 606, and an antenna 608. The antenna 608 can be configured to facilitate transmission and reception of RF signals, preferably in the 13.56 MHz range. The antenna 608 comprises a cobalt doped nickel zinc ferrite configured in such a manner that the cobalt content is adjusted to a level where the cobalt dominated relaxation peak merges into the low frequency end of the Ni/Zn ratio peak. In one implementation, at least a portion of the antenna 608 has a composition that can be represented by the formula $Ni_{1-x-y}Zn_xCo_yFe_2O_4$, where x=0.2 to 0.6, and 0≤y<0.2. In another implementation, at least a portion of the antenna 608 has a composition that can be represented by the formula $Ni_{1-w-x-y-z}Zn_wCo_xMn_yCu_zFe_{2-a}O_{4-x}$ where 0.2≤w≤0.6; 0≤x≤0.2; 0≤y≤0.2; 0≤z≤0.2; and 0≤a≤0.2.

While certain embodiments of the inventions have been described, these embodiments have been presented by way of example only, and are not intended to limit the scope of the disclosure. Indeed, the novel compositions, methods and systems described herein may be embodied in a variety of other forms; furthermore, various omissions, substitutions and changes in the form of the compositions, methods and systems described herein may be made without departing from the spirit of the disclosure. The accompanying claims and their equivalents are intended to cover such forms or modifications as would fall within the scope and spirit of the disclosure.

What is claimed is:

1. An RF device comprising:
   a composition represented by the formula

   $Ni_{1-w-x-y-z}Zn_wCo_xMn_yCu_zFe_{2-a}O_{4-1.5a}$, w being greater than or equal to 0.2 and less than or equal to 0.6;
   x being greater than or equal to 0 and less than or equal to 0.2;
   y being greater than or equal to 0 and less than or equal to 0.2;
   z being greater than or equal to 0 and less than or equal to 0.2;
   a being greater than or equal to 0 and less than or equal to 0.2; and
   said RF device operates in the 13.56 MHz band.

2. The RF device of claim 1 wherein z=0 in the formula representing the composition.

3. The RF device of claim 1 wherein y=0 in the formula representing the composition.

4. An RF device comprising:
   a composition represented by the formula

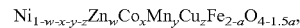
   $Ni_{1-w-x-y-z}Zn_wCo_xMn_yCu_zFe_{2-a}O_{4-1.5a}$, w being greater than or equal to 0.2 and less than or equal to 0.6;

x being greater than or equal to 0 and less than or equal to 0.2;

y being greater than or equal to 0 and less than or equal to 0.2;

z being greater than or equal to 0 and less than or equal to 0.2;

a being greater than or equal to 0 and less than or equal to 0.2; and said RF device is an antenna.

5. The RF device of claim 4 wherein z=0 in the formula representing the composition.

6. The RF device of claim 4 wherein y=0 in the formula representing the composition.

7. An RF device comprising:

a modified nickel-zinc ferrite composition represented by the formula

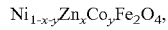

$Ni_{1-x-y}Zn_xCo_yFe_2O_4$, x being greater than or equal to 0.2 and less than 0.6, and y being greater than or equal zero and less than 0.2; and said RF device is selected from the group consisting of RFID tags, biomedical sensors, and RF antennas.

8. An RF device comprising:

a modified nickel-zinc ferrite composition represented by the formula

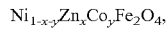

$Ni_{1-x-y}Zn_xCo_yFe_2O_4$, x being greater than or equal to 0.2 and less than 0.6, and y being greater than or equal zero and less than 0.2; and said RF device operates in the 13.56 MHz band.

* * * * *

UNITED STATES PATENT AND TRADEMARK OFFICE
CERTIFICATE OF CORRECTION

PATENT NO. : 9,505,632 B2
APPLICATION NO. : 14/452340
DATED : November 29, 2016
INVENTOR(S) : Hill et al.

Page 1 of 1

It is certified that error appears in the above-identified patent and that said Letters Patent is hereby corrected as shown below:

In the Specification

In Column 2 at Line 17 (approx.), After "13.56" insert --MHz.--.

In Column 2 at Line 47, Change "$Co^{-2}$" to --$Co^{+2}$--.

In Column 2 at Line 48, Change "x >0.2" to --x=0.2--.

In Column 2 at Line 53, Change "$MnO,_x$" to --$MnO_x$,--.

In Column 2 at Line 56, Change "$Ni_{i-w-x-y-z}$" to --$Ni_{1-w-x-y-z}$--.

In Column 6 at Line 9, Below "in air or in oxygen." insert --Device and System Incorporating Modified Ni-Zn Material--.

Signed and Sealed this
Twenty-first Day of March, 2017

Michelle K. Lee
*Director of the United States Patent and Trademark Office*